| United States Patent [19] | [11] Patent Number: 4,898,615 |
| Trivino Vazquez et al. | [45] Date of Patent: Feb. 6, 1990 |

[54] METHOD OF MANUFACTURING CEMENT

[75] Inventors: Fernando Trivino Vazquez, Madrid, Spain; Roger J. Clenin, Puplinge, Switzerland

[73] Assignee: Catrel S.A. Societe D'Etudes et D'Applications Industrielle, Geneva, Switzerland

[21] Appl. No.: 138,160

[22] Filed: Dec. 28, 1987

[30] Foreign Application Priority Data

Mar. 12, 1987 [CH] Switzerland ............................ 933/87

[51] Int. Cl.$^4$ ............................ C04B 7/04; C04B 7/06
[52] U.S. Cl. ............................ 106/103
[58] Field of Search ............................ 106/103, 100

[56] References Cited

U.S. PATENT DOCUMENTS

| 763,685 | 6/1904 | Marsden | 106/103 |
| 1,004,380 | 9/1911 | Daker | 106/103 |
| 1,627,170 | 5/1927 | Gerlach | 106/103 |
| 1,731,189 | 10/1929 | Bergquist | 106/103 |
| 3,600,476 | 8/1971 | Suzuki | 106/100 |

FOREIGN PATENT DOCUMENTS 658102  2/1977  U.S.S.R. .

OTHER PUBLICATIONS

Henderson et al., *Metallurgical Dictionary*, 1983, p. 293.
Alsted-Nielsen et al., "Préparation des ciments aux cendres volantes", Ciments, Bétons, plâtres, chaux, No. 1, pp. 36–41, (1981).

*Primary Examiner*—Mark L. Bell
*Attorney, Agent, or Firm*—Cushman, Darby and Cushman

[57] ABSTRACT

A novel method for manufacturing cement utilizing crushed refuse. The method comprises a first step of preparing a homogeneous powder mixture from a majority of crushed refuse substantially free of metal constituents and a minority of at least one first mineral material containing calcium oxide in the free or combined state. In a second step, the powder mixture is granulated under pressure. A third step comprises heat treating the granules at a temperature between 130° C. and 230° C. for a length of time sufficient to bring the water content of the granules to between about 0.1 and 1.0% by weight. The third step produces a refuse product. A fourth step comprises mixing the refuse product with a first starting mixture and firing the resulting clinker mixture in a kiln, producing a clinker. In the last step, gypsum is added to the clinker and the resulting cement mixture is crushed.

13 Claims, No Drawings

METHOD OF MANUFACTURING CEMENT

BACKGROUND OF THE INVENTION

The present invention relates to a method of manufacturing cement by firing at high temperature a mixture of limestone and clay, or a mixture of silica, lime, alumina and iron oxides, adding gypsum to the product resulting from this firing, and crushing of the final mixture thus obtained.

As is well known, the manufacture of cement by the usual method mentioned above necessitates use of a large amount of heat energy. This energy is generally supplied by the combustion of a suitable fuel, such as coal, liquid hydrocarbons or natural gas, and firing the mixture of the starting ingredients at high temperature. In fact, the amount of heat energy required for manufacturing 1 kg of cement clinker is on the order of 700 to 1500 kilocalories.

It is also well known hat the amount of refuse and residues, such as household refuse and industrial waste, which needs to be eliminated, increases constantly in the industrialized countries. The elimination of refuse and residues poses problems which are becoming more and more difficult to solve.

More precisely, refuse is generally either simply stored in rubbish heaps, or incinerated and pyrolysed. These two procedures present serious disadvantages which are well known. In both cases there is a very high risk of pollution. In particular, in the case of incineration and pyrolysis, certain substances which are very often present in refuse are capable of releasing toxic gases into the atmosphere. Severe limitations thus result in practicing this treatment of rubbish and waste.

The progressive accumulation of considerable volumes of untreated waste or of residues from incineration incapable of any subsequent use, likewise poses serious problems.

The composition of refuse varies widely and in a more or less random manner as a function of the place, the conditions of its collection, and, likewise, according to the season. However, the composition lies generally within certain limits, which, in the industrial countries, are approximately as follows (expressed in percent by weight):

| | |
|---|---|
| Paper and cardboard | 45 to 53 |
| Rags and other textile matter | 10 to 13 |
| Metals | 7 to 9 |
| Glass | 8 to 12 |
| Stoney and sandy matter | 7 to 9 |
| Putrescent matter (in particular waste vegetables and other vegetable matter) | 4 to 8 |
| Plastics matter | 4 to 6 |
| Rubber | 1 |

Consequently, refuse contains, in every case, a significant percentage of combustible matter, which, statistically, would generally be on the order of 25% by weight.

The foregoing considerations have led to the idea of employing crushed refuse (previously rid of metallic components) as solid fuel, either as a powder, or in the form of briquettes for heating rotary cement kilns.

On the other hand, the ash obtained by the combustion of refuse contains mineral matter, especially calcium oxide, silica, alumina and ferrous oxide, found in clinkers. It has therefore been proposed to incorporate the ash from the refuse thus burnt, for heating the cement kilns into the starting ingredients for the manufacture of clinker. Methods founded upon these principles are described in the British Patents Nos. 1,450,294 and 1,510,392.

More precisely, British Patent No. 1,405,294 ('294), describes a method of manufacturing cement according to which the raw matter for the manufacture of clinker is introduced at one end of a rotary kiln and into the combustion zone of the kiln from the other end. A mixture of at least one fuel (e.g., pulverized coal, liquid hydrocarbon or fuel gas) intended for heating the kiln, a sufficient amount of air, and the crushed refuse is injected into the kiln. The mixture of refuse and fuel may reach 60% by weight fuel. The composition of the raw materials usually used in the manufacture of clinker is regulated in order to take into account the incorporation of ash resulting from the combustion of the crushed refuse.

In accordance with the method described in the British Patent No. 1,510,392 ('392), crushed refuse is employed as fuel for heating a cement kiln and the ash resulting from the combustion of the refuse is likewise incorporated into the raw materials for the manufacture of clinker. The difference between the method of '392 and the method described in the '294 is that the combustion of the refuse is carried out in a zone external to the cement kiln and not in the combustion zone of the kiln.

Thus, by the above methods, one is able to both solve the problem posed by the accumulation of refuse in public rubbish heaps and economically heating cement kilns.

In addition, it has been found that if the gases from combustion of the refuse are made to pass through the rotary cement kiln, a rate of emission of pollutant gas may be obtained which is less than that which is observed in the usual installations for pyrolizing refuse.

However, the proportion of refuse which one can eliminate in the above-mentioned manner with respect to the amount of clinker produced in the kiln remains limited to less than about 10%. Beyond such a percentage, the pollution released by the combustion of the refuse becomes too great and the composition of the clinker containing the ash from refuse departs from established standards.

It is therefore an object of the present invention to enable incorporation of larger amounts by weight of refuse into the starting ingredients for the manufacture of cement, without changing the composition of the clinker obtained, while practically completely eliminating the risk of pollution from the pyrolysis of the refuse in the firing furnace.

SUMMARY OF THE INVENTION

In accordance with the above object, we have provided a novel method for manufacturing cement utilizing crushed refuse. The method comprises a first step of preparing a homogeneous powder mixture from a majority of crushed refuse substantially free of metal constituents and a minority of at least one first mineral material containing calcium oxide in the free or combined state. In a second step, the powder mixture is granulated under pressure. A third step comprises heat treating the granules at a temperature between 130° C. and 230° C. for a length of time sufficient to bring the water content of the granules to between about 0.1 and 1.0% by weight. The third step produces a refuse product. A fourth step comprises mixing the refuse product with a first starting mixture and firing the resulting clinker mixture in a kiln, producing a clinker. In the last step, gypsum is added to the clinker and the resulting cement mixture is crushed.

Preferably, the first starting mixture is a mixture of limestone and clay, or a mixture of silica, lime, alumina, and iron oxides.

The mineral material is preferably selected from quick lime, fly ash, calcite, slag and a conventional mixture of starting materials used in the manufacture of cement.

The refuse product is preferably injected into at least one secondary burner for heating the kiln. The secondary burner is disposed upstream of the kiln, taking into account the direction of movement of the clinker mixture into the kiln.

Further objects, features and advantages of the present invention will become apparent from the Detailed Description of Preferred Embodiments which follows, when considered together with the illustrative examples.

DETAILED DESCRIPTION OF PREFERRED EMBODIMENT

The method of the present invention comprises incorporating a refuse product into ingredients for the manufacture of clinker. The refuse product is obtained by granulating, under pressure, a homogeneous mixture containing a major proportion of crushed refuse, which is practically free from metallic constituents, and a minor proportion of at least one mineral matter containing calcium oxide in the free or combined state. The granules so formed are heat treated at a temperature between 130 and 230° C. for a length of time such that their water content is brought to 0.1 to 1% by weight.

It has been surprisingly found that if one incorporates into the mixture of the usual starting ingredients for the manufacture of cement, a product resulting from a thermochemical and mechanical treatment of refuse instead of incinerating the refuse first, one eliminates the risk of pollution from the release of toxic gases.

An important advantage of the method according to the present invention lies in the fact that, in practice, one can easily proportion the mixture of crushed refuse and mineral matter containing calcium oxide, so that the product resulting from the heat treatment of the granules formed has a well defined and perfectly reproducible composition even if the composition of the starting refuse varies. This enables the product obtained by heat treatment of the mixture of crushed refuse and mineral matter containing calcium oxide to have a predetermined composition suited for use in a mixture with the unusual ingredients for the manufacture of cement clinker.

In addition, the product obtained by treatment of the mixture of crushed refuse and mineral matter containing calcium oxide is practically neutral and not putrescible. The product may thus be easily stored for long periods, which would obviously not be the case for untreated refuse. Also, the product has the advantage of having a higher calorific value than that of the starting crushed refuse.

The proportion of the refuse-based product according to the invention which may be incorporated into the mixture of the usual ingredients for the manufacture of cement before firing at high temperature, may reach and even exceed 20% by weight with respect to the initial mixture without affecting the quality of the clinker obtained.

Preferably, the composition of the refuse-based product and of the mixture of usual ingredients for the manufacture of clinker are chosen such that the ratio of $CaO/SiO_2$ in the final mixture lies between 3 and 4.

The mineral material containing calcium oxide in the free or combined state which is mixed with crushed refuse may be chosen from among: quicklime, flyash, calcite, slag and the usual mixtures of starting ingredients for the manufacture of cement (that is to say, mixtures of limestone and clay or mixtures of silica, lime, alumina and iron oxides in suitable proportions for the obtaining of cement).

The relative proportions of crushed refuse and mineral matter containing calcium oxide are, advantageously, such that the mixture contains from 90 to 95% by weight refuse and from 5 to 10% by weight mineral material.

Various additives may be incorporated into the mixture of the crushed refuse and mineral material containing calcium oxide. Preferably, at least one binder and/or at least one material which confers optimum plasticity and rheological properties for granulation under pressure is added.

The different operations required according to the method of the invention may be carried out in any suitable manner, particularly by employing the known techniques and conventional apparatae for the treatment of refuse.

In particular, refuse may be employed which is subjected to the usual operations of sorting and screening in order to separate from it objects which are possibly recoverable and/or recyclable, particularly metallic objects of large dimensions.

After initial sorting, the refuse may be converted into a homogeneous powdery mixture, substantially free from metallic matter, particularly iron. The refuse may then be subjected to crushing and mixing carried out simultaneously, separately, or possibly combined with one or more sorting operations intended for separating metallic scraps, and more particularly, scraps of iron-based material.

For example, sorted refuse may be subjected to a first, coarse crushing, down to an average particle size of about 50 millimeters. This first crushing is carried out before or after magnetic sorting intended for removing particles of iron and other ferromagnetic matter. The first crushing is followed by a second crushing carried out by means of a rotary hammer crusher or a chipper, for example, so as to reduce the refuse into particles (in the form of granules and fibres) having maximum dimensions less than 10 to 20 millimeters.

The operation of mixing the mass of crushed refuse with the mineral matter containing calcium oxide may likewise be carried out by employing any suitable technique and apparatus, in particular by means of automatic proportioning and mixing devices which operate intermittently or continuously.

In order to prepare granules from the mixture of crushed refuse and mineral matter containing calcium oxide, one may advantageously employ a rotary granulator apparatus having rollers and a die. An apparatus of this type is conventionally employed for the production of granular food for cattle. Such a device produces cylindrically shaped tablets having, for example, lengths of from 6 to 30 millimeters and diameters of from 2 to 20 millimeters. The device granulates under a pressure on the order of 150 to 900 bars.

Heat treatment of the granules may advantageously be carried out by passing them in the axial direction through a tubular rotary kiln arranged with its axis of rotation in the practically horizontal position and equipped with a spiral inner wall to ensure the circulation of the granules. The duration of heat treatment suitable for obtaining the required water content, between 0.1 and 1% by weight, is, for example, on the order of 30 minutes.

Preferably, the refuse product is incorporated into the mixture of ingredients for the manufacture of clinker by injecting the product, advantageously reduced beforehand into a fine powder, alone or as a mixture with at least one combustible material of the usual type, into at least one secondary burner. The secondary burner forms part of a precalcinator placed upstream of the cement kiln. As is well known, such a precalcinator enables heating of the ingredients for the manufacture of clinker before their introduction into the rotary cement kiln.

The combustible material mixed with the refuse product before injection into the secondary burner or burners in the cement kiln may not only be conventional combustible material such as pulverized coal, liquid hydrocarbons and combustible gases but also practically any combustible matter at all—including "poor" fuels having a low caloric value. In practice, one may employ any combustible matter having a caloric value at least equal to 2000 kcal/kg.

One may likewise incorporate the refuse-product into the mixture of the ingredients for the manufacture of clinker before introduction into the kiln by mixing this product either in the form of granules or in the powdered state obtained by crushing the granules.

In order to regulate the composition of the clinker to obtain a clinker having a predetermined, desired composition, particularly a composition in accordance with the usual standards of composition of cement, it may be necessary to incorporate at least one additional raw material into the mixture to be fired in the kiln at high temperature. The additional raw material may contain necessary constituents of clinker or substances which are capable of being at least partially converted into such constituents during the course of firing.

Such an additional raw material may in particular comprise a mineral material containing calcium oxide, a siliceous material or a material containing iron as ferrous oxide, $Fe_2O_3$. The raw material may also be capable of being at least partially converted into the above oxides at the time of firing in the cement kiln.

The additional mineral material containing calcium oxide may comprise thermal calcite which corresponds to a content of 92% by weight of CaO, in the calcined state. The additional siliceous mineral material may comprise clay, siliceous flyash, quartz or waste glass. Pyrites may be used as an additional mineral matter capable of being at least partially converted into ferrous oxide during firing at high temperature in the cement kiln.

The relative proportions of the different constituents of the mixture of raw materials intended for firing (i.e., refuse-product, conventional raw materials for manufacturing clinker, and optional additional raw materials) may be easily calculated by applying the guidelines of mixing well known to one skilled in the art. Such guidelines particularly include the rules for alloying, taking into account the composition of the ash from the refuse product and the composition of the clinker which would be obtained solely from the usual raw materials for the manufacture of cement.

These proportions are advantageously regulated so that the content of CaO in the clinker which would be obtained from a mixture of the refuse-product and an additional raw material containing calcium oxide, is identical with that of the clinker obtained solely from the usual raw materials for the manufacture of cement.

It is equally advantageous to regulate the proportions of the mixture of raw materials so that the composition of the final clinker is identical, apart from the chlorine content, with that of the clinker which would be obtained solely from the usual raw materials for the manufacture of cement.

It is preferable that the relative proportions of refuse-product and of the mixture of the other raw materials subjected to firing at high temperature is within the limits suitable for obtaining cement having a suitable composition whatever the variations in the average composition of the refuse employed as the starting material.

In order to achieve these compositions, it is advantageous to analyze the refuse-product and possibly also the other raw materials for the manufacture of cement, and to proportion the materials suitably in accordance with these analyses. Any suitable apparatus for analysis and proportioning may be employed, particularly a continuously operating automatic apparatus.

Of course one may equally well maintain the composition of the refuse-product within predetermined limits, even if the average composition of the starting refuse varies, by analyzing the starting refuse and regulating the relative proportions of crushed refuse and of calcium-oxide-containing material. One may also suitably modify the composition of the calcium-oxide-containing material if this material comprises a mixture of various substances.

EXAMPLE 1

(a) Preparation of Mixture No. 1, a refuse product from mechanically and thermochemically treated refuse A homogeneous powdery mixture is prepared, comprising 90% by weight crushed refuse without metallic constituents, and 10% by weight industrial calcite (containing 51.5% of CaO by weight). This mixture is granulated under a pressure of 600 bars by means of a rotary granulator having rollers and a die. Cylindrical tablets are formed having a diameter of 8 mm and a length varying between 10 and 30 mm. These tablets contain water from about 20 to 40% by weight.

The tablets are subjected to heat treatment at a temperature of 200° C. for 30 minutes in a rotary tubular kiln. This heat treatment enables the tablets to be transformed into granules having a moisture content on the order of 0.5% by weight.

These granules are crushed by means of a hammer crusher so as to form a mixture (Mixture No. 1) containing granules and fibres having maximum dimensions lying between 0.5 and 4 mm with an average value of 2 mm.

Mixture No. 1 corresponds with a proportion of ash (obtained by calcination at 1450° C. until the weight becomes constant) of 46.8% by weight, analysis of which has given the following results (in percent by weight):

| | | | |
|---|---|---|---|
| CaO | 15.72 | SO$_3$ | 2.8 |
| SiO$_2$ | 45.45 | Cl | 2.6 |
| Al$_2$O$_3$ | 8.52 | K$_2$O | 2.2 |
| Fe$_2$O$_3$ | 12.31 | Na$_2$O | 2.3 |
| MgO | 2.36 | Other mineral matter | Remainder to 100 |

(b) Manufacture of a clinker:

A clinker is manufactured by firing in the usual manner at 1450° C. in a rotary cement kiln, a mixture of starting materials having the following composition (in parts by weight):

| | |
|---|---|
| Mixture No. 1 (prepared in the above manner) | 7.14 |
| Industrial calcite (92% by weight CaO in the calcined state) | 12.93 |
| Mixture of conventional raw materials for the manufacture of cement (mixture of 69% by weight industrial calcite and 31% by weight clay producing by firing in the cement kiln a clinker the composition of which corresponds with the values indicated below) | 150.48 |
| Quartz sand having 98% by weight SiO$_2$ (siliceous material for obtaining the desired content of 21% by weight of SiO$_2$ in the final clinker) | 0.537 |

The composition of the industrial calcite employed corresponds with the following values from analysis obtained after calcination (in percent by weight):

| | | | |
|---|---|---|---|
| CaO | 92 | SO$_3$ | 0.1 |
| SiO$_2$ | 3 | Cl | 0 |
| Al$_2$O$_3$ | 2 | K$_2$O | 0 |
| Fe$_2$O$_3$ | 0.8 | Na$_2$O | 0 |
| MgO | 1.2 | Other mineral matter | Remainder to 100% |

Thus a final clinker is obtained, the composition of which corresponds to the following (in percent by weight):

| | | | |
|---|---|---|---|
| CaO | 66.5 | SO$_3$ | 4% |
| SiO$_2$ | 21 | Cl | 0.1% |

This composition, apart from the chlorine content, is identical with that of the clinker which would be obtained solely from the mixture of industrial calcite and clay employed.

These values are in accordance with the usual standards of composition of cement.

It is to be observed that the composition of the clinker, called Clinker No. 1, which would be obtained solely from the Mixture No. 1 and from industrial calcite, corresponds to the following (in percent by weight):

| | | | |
|---|---|---|---|
| CaO | 66.5 | SO$_3$ | 0.99 |
| SiO$_2$ | 16.9 | Cl | 0.87 |
| Al$_2$O$_3$ | 4.2 | K$_2$O | 0.73 |
| Fe$_2$O$_3$ | 4.65 | Na$_2$O | 0.73 |

Hence it may be seen that the content of CaO in the Clinker No. 1 is identical with the content of this compound in the clinker which would be obtained from the mixture of the usual ingredients for manufacture of cement. The 21% SiO$_2$ content of the final clinker (identical with that in the clinker obtained from the mixture of the usual ingredients) is reached thanks to the addition of the quartz sand considered as additional siliceous material.

The crushed refuse employed as raw material has a caloric value of about 3000 kcal/kg. Firing the whole mixture of starting materials indicated above in the cement kiln in order to obtain the final clinker requires a total heat energy of 900 kcal/kg (with respect to the weight of clinker obtained). Consequently, using 0.3 kg of crushed refuse as raw material in the above mixture with the other ingredients indicated, supplies enough heat energy for manufacturing 1 kg of clinker. The result is a savings of 11% in the cost of fuel under the conditions of the present example.

EXAMPLE 2

In a similar manner to that which is described under Example 1 one prepares a refuse product based on mechanically and thermochemically treated refuse (Mixture No. 2) and manufactures a clinker.

The starting crushed refuse has a composition such that the analysis of the ash from Mixture No. 2 gives the following results (in percent by weight):

| | | | |
|---|---|---|---|
| CaO | 14.7 | SO$_3$ | 0% |
| SiO$_2$ | 47.35 | Cl | 1% |
| Al$_2$O$_3$ | 20.83 | K$_2$O | 1.9% |
| Fe$_2$O$_3$ | 5.68 | Na$_2$O | 2% |

The final clinker has the same composition as that obtained in accordance with Example 1.

The total mixture of materials fired in the cement kiln has the following composition (in parts by weight):

| | |
|---|---|
| Mixture No. 2 (quantity indicated in weight of ash corresponding with the weight of mixture employed) | 24 |
| Industrial calcite | 22.78 |
| Mixture of 72% by weight industrial calcite and 28% by weight clay (identical with that employed in Example 1) | 111.28 |
| Quartz sand having 98% by weight SiO$_2$ | 1.44 |
| Pyrites (quantity indicated in equivalent weight of Fe$_2$O$_3$ | 0.69 |

The composition of the clinker, called Clinker No. 2, which would be obtained solely from the Mixture No. 2 and from the industrial calcite (in the relative proportions specified above) corresponds to the following (in percent by weight):

| | | | |
|---|---|---|---|
| CaO | 66.5 | SO$_3$ | 0.07 |
| SiO$_2$ | 17.63 | Cl | 0.33 |
| Al$_2$O$_3$ | 8.21 | K$_2$O | 0.62 |
| Fe$_2$O$_3$ | 2.40 | Na$_2$O | 0.66 |

| | -continued |
|---|---|
| MgO | 1.35 |

The final clinker has the same composition as that obtained in accordance with Example 1.

The employment of crushed refuse in the proportions and under the conditions specified above in the present example, enables savings of 25% to be realized in the cost of fuel necessary to fire the raw materials for the manufacture of the clinker in the cement kiln.

What is claimed is:

1. A method for manufacturing cement, comprising the steps of:
   (a) preparing a homogenous powder mixture from (i) crushed refuse being substantially free of metal constituents, containing water and containing a significant percentage of combustible materials, and (ii) at least one first mineral material containing calcium oxide in the free or combined state, wherein said powder mixture comprises greater than 50% by weight refuse and less than 50% by weight of said first mineral material;
   (b) granulating the powder mixture under pressure, whereby granules are produced;
   (c) heat treating the granules at a temperature between about 130° and 230° C. for a length of time sufficient to bring the water content of the granules to between about 0.1 and 1.0% by weight, whereby a heat-treated refuse product is produced;
   (d) mixing the heat-treated refuse product with a components selected from the group consisting of a mixture of limestone and clay and a mixture of silica, lime, alumina and iron oxides, and firing the resulting mixture in a kiln, whereby a clinker is produced; and
   (e) adding gypsum to said clinker and crushing the resulting mixture, whereby cement is produced.

2. A method as recited in claim 1, further comprising, before step (d), the step of injecting said refuse product into at least one secondary burner for heating the kiln.

3. A method as recited in claim 2, wherein said step of injecting further comprises injecting at least one combustion material.

4. A method according to claim 2, further comprising, before said injection step, the step of reducing the refuse product to a fine powder.

5. A method as recited in claim 1, wherein said clinker mixture comprises a ratio of $CaO/SiO_2$ of between about 3 and about 4.

6. A method according to claim 1, wherein said first mineral material is selected from quicklime, flyash, calcite, slag and a component selected from the group consisting of a mixture of limestone and clay and a mixture of silica, lime, alumina and iron oxides.

7. A method as recited in claim 1, wherein said clinker mixture further comprises at least one second mineral material containing calcium oxide or capable of being at least partially transformed into calcium oxide during firing.

8. A method as recited in claim 7, wherein said second mineral material is calcite.

9. A method as recited in claim 1, wherein said clinker mixture comprises at least one additional siliceous material.

10. A method as recited in claim 9, wherein said additional siliceous material is selected from clay, siliceous flyash, glass, quartz sand and silica.

11. A method as recited in claim 1, where said clinker mixture further comprises at least one additional iron material containing ferrous oxide, $Fe_2O_3$, or capable of being at least partially converted into ferrous oxide during firing.

12. A method as recited in claim 1, wherein said powder mixture comprises 90–95% by weight refuse and 5–10% first mineral material.

13. A method as recited in claim 2, wherein said secondary burner is disposed upstream of said kiln so that the step (d) of mixing the refuse product with a first starting mixture is facilitated.

* * * * *